United States Patent

[11] 3,609,277

[72] Inventors Bernard Dallet
Savigny-sur-orge;
Jacques Doucerain, Paris; Jean Moulin,
Ris-Orangis, all of France
[21] Appl. No. 54,281
[22] Filed July 13, 1970
[45] Patented Sept. 28, 1971
[73] Assignee Societe de Traitements Electrolytiques et
Electrothermiques (S.T.E.L.)
[32] Priority May 14, 1970
[33] France
[31] 70/17659

[54] BRAZING PRESS PARTICULARLY FOR BRAZING EXTENDED SURFACES HAVING RELIEVED CORNERS TO A MATCHING PLATE
6 Claims, 4 Drawing Figs.
[52] U.S. Cl. .................................................. 219/6.5,
29/493, 100/93 P, 219/9.5
[51] Int. Cl. ..................................................... H05b 5/00
[50] Field of Search ............................................. 219/6.5,
9.5, 10.53; 29/493; 126/390; 100/93 P

[56] References Cited
FOREIGN PATENTS
73,672  9/1960  France ......................... 219/85
1,064,903  4/1967  Great Britain ................ 219/10.49

Primary Examiner—J. V. Truhe
Assistant Examiner—Hugh D. Jaeger
Attorney—Flynn & Frishauf ABSTRACT: To unite surfaces with relieved corners, such as the bottoms of shaped cooking utensils, pots, pans or skillets, to a heat distribution plate, an intermediate or buffer plate having a slightly concave, thin central region is applied around the plate to be brazed, or fused to the bottom of the utensil, the buffer plate having peripheral edges matching the edges of the plate; and the press further includes peripheral heating coils, for example energized by high frequency, to provide additional high frequency induction heating at the edges.

BRAZING PRESS PARTICULARLY FOR BRAZING EXTENDED SURFACES HAVING RELIEVED CORNERS TO A MATCHING PLATE

Cross-references to related applications are application Ser. No. 54,250 filed July 13, 1970 and Ser. No. 54,251 filed July 13, 1970.

The present invention relates to brazing presses, and more particularly to presses which are heated to effect, in one operation, brazing, or fusing of a plate against another plate, one of which has chamfered, or relieved edges, and the plates matching each other in outline; the invention is especially adapted to fuse heat distributing bottoms, of a good heat-conductive material such as copper, or aluminum to stainless steel cooking utensils, which have internal rounded bottoms.

Presses to braze, or fuse together metal plates which are generally plane are known. It is also known to fuse together heat distribution plates to the bottoms of cooking utensils originally presented to the fusion press as a blank, or workpiece of stainless steel. The bottom heat diffusers, of a good heat-conductive metal, such as copper, aluminum, or its alloys, is applied as a plane, flat plate brazed to the plane, flat bottom of the work blank. The brazing, or fusion presses were not, however, capable of assembling diffusion bottoms which have curved sides matching the curved sides of the press blank, so that the heat-diffusing region will encircle the lateral skirt of the cooking utensil, at least in the region of the bottom, or of the curvature thereof.

It is an object of the present invention to provide a fusion, or brazing press in which a metal plate can be fused, or brazed to a metal workpiece which has relieved, or rounded edges, the metal plate embracing the relief at the edges.

SUBJECT MATTER OF THE PRESENT INVENTION

Briefly, in accordance with the present invention, the brazing press has a press bed, mandrel supporting the work blank, a press screw, or jack and an inductive heating block; in order to join a bottom plate, with curved edge portions to the workpiece with relieved, curbed edges, am intermediate, or buffer plate of ferromagnetic material, also termed a "susceptor" plate is provided which has a thin central portion, slightly concave, and a peripheral portion with relieved edges; the face of the edges being arranged to encircle, and adapt themselves to the final form of the plate to be applied to the bottom of the work blank. Upon application of pressure, in a vertical direction, the susceptor element will force the plate to be brazed against the workpiece, at the bottom, but principally along the periphery. A supplementary inductor coil is provided encircling the edges of the susceptor plate at the exterior, in order to supply additional heat at the side of the susceptor plate and to effect a reliable fusion, or brazing bond between the curved portions against the bottom, as well as against the side of the workpiece.

In accordance with an embodiment of the invention, the intermediate, or susceptor element can simultaneously shape the diffusion plate while heating the heat diffusion plate for fusion with the bottom, as well as the sides of the cooking utensil to be laminated with the heat diffusion plate.

The invention will be described by way of example with reference to the accompanying drawings, wherein.

Figure 1:
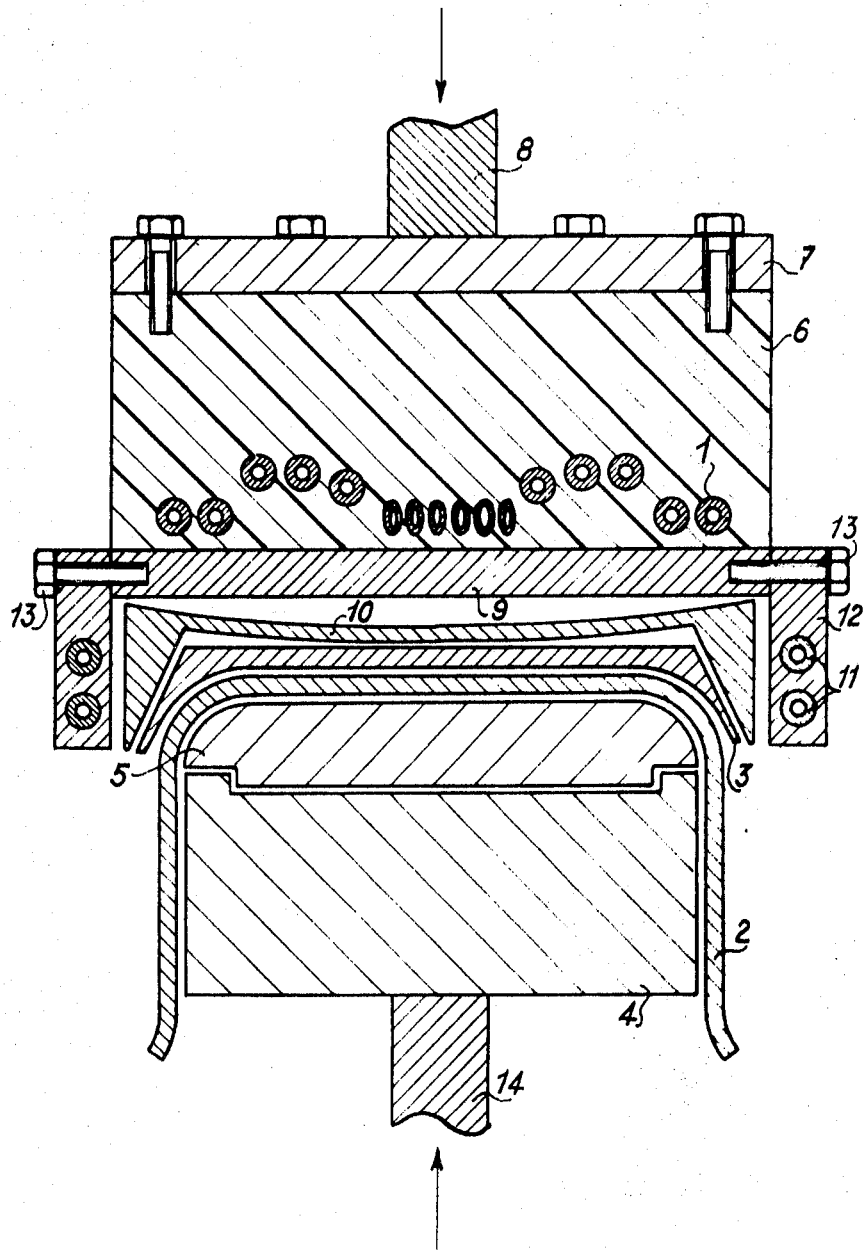
FIG. 1 is a longitudinal cross-sectional view of an apparatus of the present invention, illustrating, in slightly exploded form, the operation of the present invention.

The inductor of FIG. 1 is generally of the form described in application Ser. No. 54,251 although other inductors may also be used. Inductors made and adjusted in accordance with the teaching of the aforementioned application provide a particularly good heat distribution along the interface between the work blank 2 and heat distribution plate 3, to be brazed to the blank 2. Workpiece, or blank 2 is, for example, of stainless steel; plate 3 is a metal of a good heat conductor, such as, for example, copper, aluminum, or an aluminum alloy. A flux metal, or brazing metal is preferably applied between the blank 2 and plate 3, not shown in the drawings, because it is very thin and its use is known in the art; the flux metal is of the type that it has a fusion point which is close to that of the metal-forming plate 3, that is, for example, close to the fusion point of aluminum or aluminum alloy used.

Blank 2 is supported on a mandrel which consists of two elements; one element, 4, in contact with the skirt of the workpiece 2 is supported by a portion of the press bed, or press jack 14. The other, placed on top thereof, is in contact with the inner side of the bottom of the work blank 2. Element 5 of the support is, preferably, of good thermal insulating material, for example made of asbestos cement. The shape of the mandrel portion 5, as well as that of portion 4, conforms to that of the final shape which the work blank 2 is to have.

The bottom of the heat-diffusing element 3 is preformed, that is, the face to be fused to blank 2 is adapted to the final shape thereof. The inductor 1 is encapsulated in a plastic material and forms a block 6, supported by a metal plate 7, and is connected by means of rod 8 to the press bed in a known manner, and not further illustrated in the drawings. Inductor block 6 is protected against excessive heating by a cold shroud, not shown in the drawing, and by an asbestos cement plate 9.

Heat diffusion plate 3 is to be brazed, or fused to blank 2 not only along the bottom thereof, but also the along the sides. Accordingly, the press of the present invention utilizes an intermediate buffer, or forming plate of ferromagnetic material 10, termed a susceptor plate, of specific shape. The susceptor plate 10, in accordance with the prior art, is usually a flat, plane plate; in accordance with the present invention, the susceptor plate is shaped to encircle the edges of the heat-diffusing element 3, is curved towards the central bottom of the heat-diffusing plate 3, and additionally upon application of pressure in the sense of the arrows transmitted by press stems 8, 14, will press together the heat-diffusing plate 3 against not only the bottom of blank 2, but slide around and press the sides, encircling the bottom thereagainst as well. Thus, pressure will be transmitted through the susceptor plate 10, from the bottom plate 9 of the press itself, and plate 10 will tend to match plate 3 exactly to the shape of work blank 2.

Generally, susceptor plate 10 is dish-shaped, with a central portion which is relatively thin, and has a slight concave bend; the peripheral portion is much thicker than the central portion. The interior face of the edges of susceptor plate 10 which will engage the edges of the diffusing plate 3 is shaped to adapt to the shape the diffusing plate is to have when fused to the work blank, to assure locked-in contact of the bottom of diffuser 3 with the bottom of the work blank 2, and, additionally, along the sides thereof, so that the entire extent of the matching, contacting faces of the blank 2 and diffusion plate 3 will be under pressure supplied by the press mechanism itself, and transmitted over stems 8 and 14.

To effect fusion, high-frequency electric energy is applied to the inductors which heat the susceptor originally held by its edges against the bottom of the diffusion plate 3. When the temperature has reached a predetermined value, the press is actuated and pressure exerted by the press jack will then be applied, as well, to the edges of the susceptor, acting on plate 3.

The principal inductor 1 will heat principally the flat portion of the diffusion element 3, to fuse element 3 to the blank 2 along the bottom thereof. Since the plate 3 has, additionally, a region extending around the rim thereof, additional heat must be supplied to ensure fusion of the edges of the diffusion plate 3 to the curved portion of the blank 2, so that the bottom of the skirt of the blank 2 (when the cooking utensil is in its normal, upright position, turned 180° with respect to FIG. 1) will fuse against the edge portions of blank 3. A supplementary inductor 11 is, therefore, provided and formed as a cylindrical, or rectangular tube, for example (and preferably) of copper, and cooled internally by having a cooling fluid, such as water circulating therein. The supplementary inductor 11 may be encapsulated in a plastic 12, and secured, for example by means of screws 13, to plate 9. Supplementary inductor 11 is located adjacent the edge portions of susceptor 10 in such a manner that it can be closely coupled locked electromagnetically therewith. The shape of the supplementary inductor 11, encapsulated in material 12, as well as the intensity of the high-frequency current applied therethrough is determined by the shape of the articles to be joined together. As a design criterion, the temperature throughout the interface of plate 3 and work blank 2 should be as uniform as possible during brazing, so that there will be little temperature differences along the interface between the heat diffusion plate 3 and the work blank 2. The value of the current to be passed through inductor 11 can readily be determined by making a few test samples and then examining the joints formed; alternatively, the method disclosed in the aforementioned patent application may be used.

The susceptor plate 10 is centrally slightly concave. Upon application of pressure, in accordance with the arrows (FIG. 1) the susceptor plate will pivot slightly along the edge portions, and press the edges of diffusion plate 3 firmly against the blank 2, as the central portion of the susceptor plate 10 becomes flat. The temperature in the interface is such that the brazing metal, or flux fuses with, and unites the heat diffuser plate 3 to the work blank 2.

Figure 2:
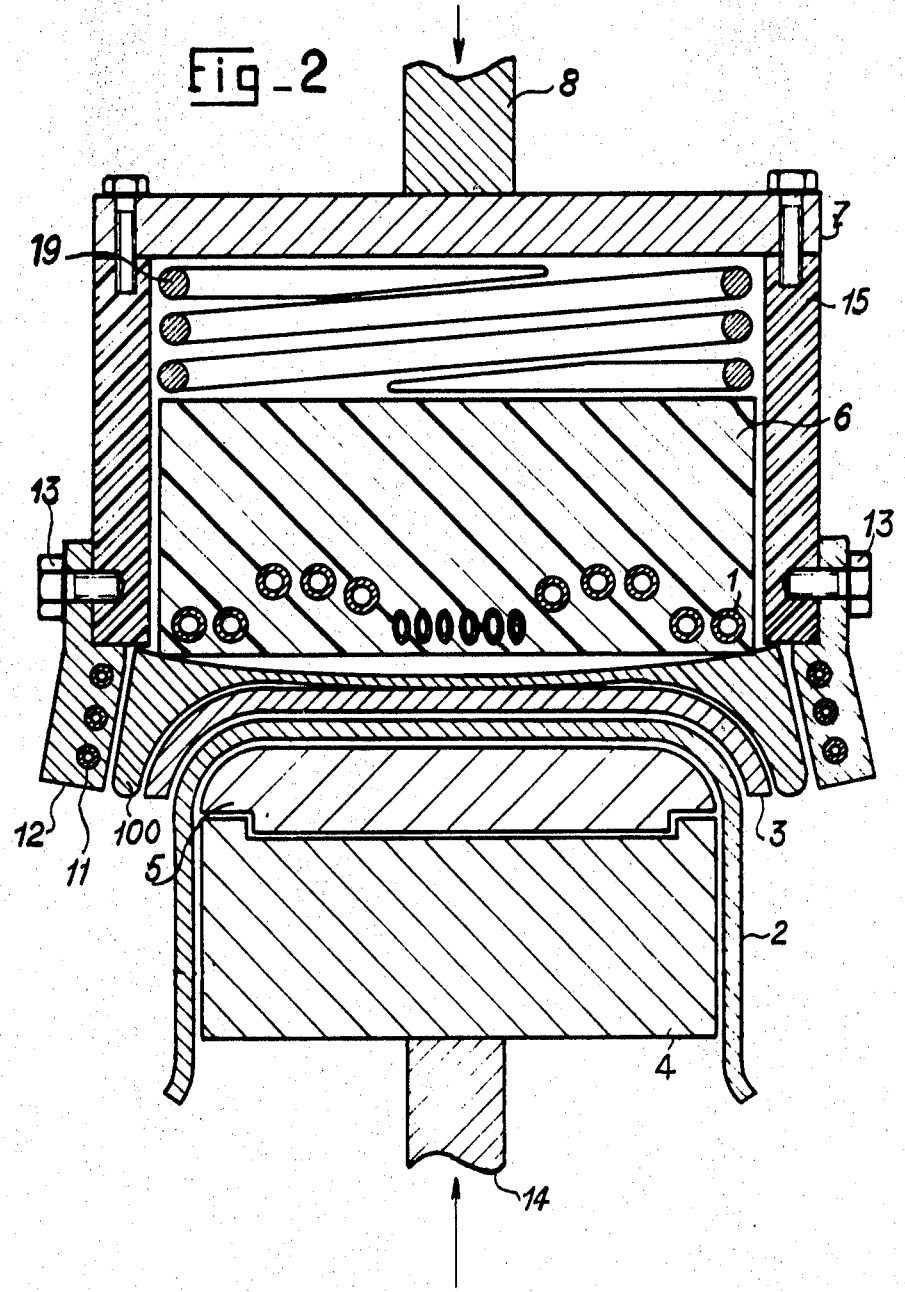
FIG. 2 is a view similar to FIG. 1, and illustrating another embodiment of the present invention.
Figure 3:
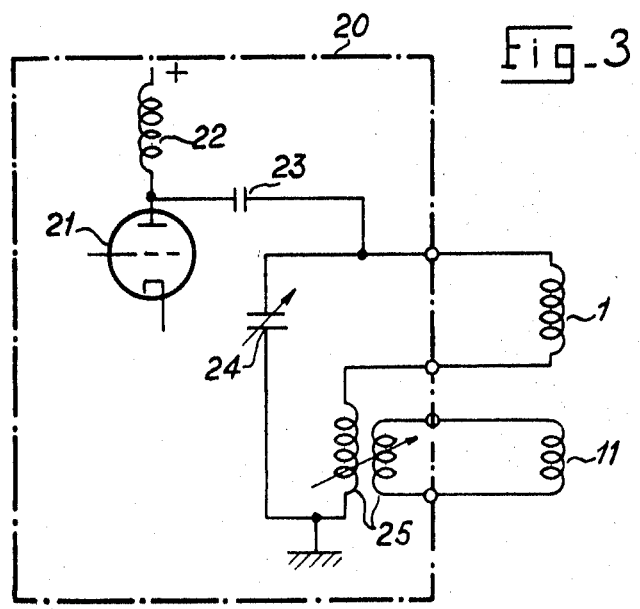
FIGS. 3 and 4 are schematic circuit diagrams illustrating supply of power to auxiliary heating inductors, to be used in the embodiments of FIGS. 1 or 2.

FIG. 2 illustrates a modified embodiment of the present invention. The brazing press of FIG. 2 permits application of a flat plate which is not preformed to the bottom of a work blank, although the work blank has bent edges, the bottom plate overlapping the bent edges. Thus, the brazing press of FIG. 2 not only brazes, but simultaneously deforms the heat diffusion plate 3 to match the shape of the work blank 2.

Inductor block 6 is surrounded by a cylindrical housing 15 of strong, solid insulating material, for example a ceramic, since pressure must be transmitted to the edges of the susceptor element 100. The pressure is substantially higher than that to be transmitted by plate 9 (FIG. 1) since the plate 3, to be fused, not only must have the fusion pressure applied thereto, but also the deformation pressure so that it will follow the contours of the blank 2 upon being applied thereto. The cylindrical form 15 is secured by a metal plate 7 to the press stem 8, The inductor block 6 may be axially displaceable and be pressed against the face of the susceptor plate 100 by means of a spring 19, compressive force being exerted by the housing 15.

The susceptor plate 100 will have a different form from that illustrated in FIG. 1. The outer edges will be more solid, that is will be made stronger and have a greater thickness. The interior face of the outer edges should be curved to match the curvature of the work blank 2 so that, when the bottom plate 3 is fused to the work blank 2, the curvatures will be matched throughout; thus, the radius of curvature of the susceptor plate, and the radius of curvature of the work blank should preferably have the same center, and be arranged, with respect to each other, to snugly surround the plate 3, as it is being applied, to ensure tight contact over the entirety of the interface surface between work blank 2 and the plate 3, upon application.

The supplementary inductor 11 is covered by plastic material forming an annular ring 12, secured to housing 15 by means of screws 13.

The susceptor plate 100, as well as the inductor 11 in its housing may take any shape which is required to match the shape of the work blank, and need not have the specific form shown in the figures. For example, the central portion of the susceptor may be plane throughout, the exterior edges may be rectangular or square at the outside, and shaped at the inside to match the shape of the workpiece 2. As the edges of the susceptor plate 100 become farther removed from the workpiece, and from the bottom of the heat diffusion plate 3, to be applied, thermal losses will increase, and the inductor should therefore be designed to compensate for such increased losses by providing a sufficient number of turns. The susceptor plate must satisfy two contradictory criteria, and the design of the susceptor plate will therefore be a comprise. For one, the mechanical strength of the edges must be such that it can deform the heat diffusion plate 3 upon application, by fusion, to the work blank 2; on the other hand, however, the edges, as well as the central portion of the susceptor plate must be sufficiently thin so that the thermal losses therein are not excessive. The structures illustrated in FIGS. 1 and 2 meet these conflicting design criteria, the exact shape and thickness of which can be determined by experiment and from a knowledge of the dimensions involved.

The foregoing description, and the drawings illustrate only the important aspects of the press and relating to the inventive concept; known elements, such as cooling grids, heat insulators such as asbestos cement plates inserted, for example, between the interior face of inductor block 6 and susceptor unit 100 have been left off for clarity of the drawing and for ease of description. These, and other conventional elements can, of course, be used in the apparatus of the present invention as known.

Figure 4:
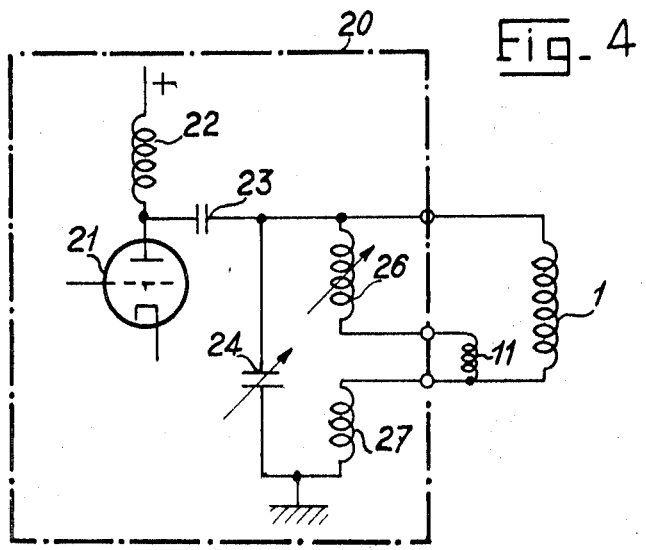

The 3 and 4 illustrate two types of supply circuits for the inductors 1 and 11. The high-frequency generator 20, for example having a vacuum tube 21, a choke 22, is connected over a high-voltage coupling condenser 23 with an oscillatory circuit of which the inductors 1 and 11 form a part. The condenser 24 of the oscillatory circuit is preferably adjustable. Condenser 24 is connected to a series circuit including a high-frequency transformer 25, of variable coupling, the secondary of which is connected to the supplementary coil 11. The principal inductor coil 1 is directly connected into the circuit. The variable coupling between HF transformer 25 permits control of the energy supplied to the inductor 11. FIG. 4 illustrates a somewhat different circuit; again, tube 21, supplied from a high-tension supply over choke 22 is coupled over a condenser 23 to a tank circuit which includes a variable capacitor 24; a first inductance 27 is connected in series with a second inductance 26, to form the tank circuit. Inductance 27, as well as inductance 26 may be located at the interior of the HF generator. The principal inductance 1 is connected in parallel across inductance 26, as well with the supplementary inductance 11 which is inserted in the series circuit formed by inductances 26 and 27. Control of the variable inductance 26 changes the amount of power supplied to inductance 11. Other circuits providing for a variable amount of power to either one, or both of the inductances 1, 11, and known in the electronics art, may be used.

The present invention has been described in detail in connection with the application of heat diffusion plates to the bottom of cooking utensils and the like; the invention is, of course, not limited to this specific application, and various changes may be made, as required by the design of the elements to be joined, within the inventive concept.

We claim:

1. Brazing or fusion press to join a work blank having rounded corners and a metal plate such that the plate will surround and match the corners comprising press means including a mandrel (4,5) supporting said work blank;

pressure means (8, 7, 6; FIG. 2: 15) applying pressure against said workpiece, and a heat-generating inductor block (6) inductively heating the face of said plate (3) and said work blank (2);

an intermediate susceptor plate (10, 100) interposed between said pressure means and said plate (3) and formed of ferromagnetic material and having a thin central portion which is slightly concave with respect to the bottom of said plate (3) and thickened peripheral portions having internal faces matching the circumference of said metal plate (3) when applied to said work blank (2) and surrounding the edge portions of said plate to apply both axial, as well as lateral pressure against said plate upon operation of the press means and the pressure means against each other;

and a supplementary inductor (11) surrounding the peripheral portions of the susceptor plate to apply additional heat to the edge portions of said plate (3) and the work blank (2) and effect secure fusion of said plate and work blank over their entire interface.

2. Press according to claim 1, for use with a plate having preformed edge portions formed with a predetermined outer profile (FIG. 1) wherein said susceptor plate (10) has an interior face shaped to conform to said predetermined profile.

3. Press according to claim 1, for use with a plate (3) preformed to match the profile of the bottom of the work blank (2), (FIG. 1);

and said intermediate susceptor plate is dished and located to receive pressure applied against the face thereof from said pressure means to effect, when pressure is applied against the outer edges thereof, compression of the peripheral portions inwardly and against the edge portions of said plate (3).

4. Press according to claim 3, wherein said intermediate susceptor plate (10) is located to have pressure applied thereto directly from said pressure means and over said inductor block.

5. Press according to claim 1, for use with a plate (3) adapted to be deformed upon application of pressure into the profile shape of said work blank (FIG. 2), wherein said pressure means comprises a housing (15) encircling said inductor block, said housing transmitting compressive force by said pressure means to said susceptor plate (100);

and said supplementary inductor (11) encircles the peripheral portions of and susceptor plate and is secured to said housing.

6. Press according to claim 5, wherein said inductor block is located within said housing;

and spring means (19) are provided biasing said inductor block (6) towards said susceptor plate (100) and resiliently maintaining said inductor block thereagainst.